US005195927A

United States Patent [19]
Raisanen

[11] Patent Number: 5,195,927
[45] Date of Patent: Mar. 23, 1993

[54] AIR INTAKE APPARATUS FOR INNER WALL

[75] Inventor: David A. Raisanen, Dassel, Minn.

[73] Assignee: Raydot, Incorporated, Cokato, Minn.

[21] Appl. No.: 740,113

[22] Filed: Aug. 5, 1991

[51] Int. Cl.$^5$ .............................................. F24F 13/10
[52] U.S. Cl. ................................. 454/271; 137/527.8
[58] Field of Search ............... 454/259, 260, 270, 271;
137/527.8; 98/118, 119; 236/45; 251/368;
49/387, 388

[56] References Cited

U.S. PATENT DOCUMENTS

| 218,596 | 8/1879 | Taber | 236/45 |
|---|---|---|---|
| 396,765 | 1/1889 | Power | 137/527.8 |
| 1,613,897 | 1/1927 | Lichty et al. | 98/33 |
| 1,943,342 | 1/1934 | Mortimer | 236/45 X |
| 2,057,627 | 10/1936 | Ferris | 98/33 |
| 2,502,736 | 4/1950 | Marcoe | 98/119 |
| 3,174,423 | 3/1965 | Rigterink et al. | 98/42 |
| 3,299,798 | 1/1967 | Nabben | 98/119 |
| 3,340,894 | 9/1967 | Williams | 251/368 X |
| 3,865,021 | 2/1975 | DeLepeleire | 137/527.8 X |
| 3,919,927 | 11/1975 | Bernard, Jr. | 98/2.17 |
| 4,184,538 | 1/1980 | Rauenhorst | 165/66 |
| 4,334,577 | 6/1982 | George | 165/54 |
| 4,384,672 | 5/1983 | Kutzner et al. | 137/527.8 X |
| 4,422,440 | 12/1983 | Russell | 236/45 X |
| 4,811,656 | 3/1989 | Meendering | 98/37 |
| 4,850,265 | 7/1989 | Raisanen | 98/37 |
| 4,850,267 | 7/1989 | Peterson | 98/42.07 |

FOREIGN PATENT DOCUMENTS

| 514410 | 2/1955 | Italy. |  |
| 151474 | 8/1985 | Japan | 137/527.8 |
| 2049160 | 5/1979 | United Kingdom. |  |

OTHER PUBLICATIONS

Raydot Brochure entitled–Biflo Inlets . . .
Raydot Brochure entitled–Dairy Farmer Finds Georgeway to be the solution in warm free stall operation.
Raydot Brochure entitled–Prize winning hog producers report good results with their Raydot ventilation system.
Raydot brochure entitled–Hog producers find improved health in their sows and litters with Georgeway heat exchanger.
Raydot brochure entitled–Georgeway Het Exchangers, by Raydot, equals fresher air, lower humidity, and healthier animals, . . .
Carroll Manufacturing, Inc. seven page product brochure.
Del-Air Systems Brochure entitled–The Del-Air C-series center air inlet A fresh idea!.
Controlled Air System brochure entitled–Controlled Air System for a breath of fresh air.
AAA Associates, Inc. brochure entitled–AAA Air Inlets.
Pruden Products, Inc. brochure entitled–Automatic ceiling inlet with adjustable counterweight.
Advanced Technology Ltd. brochure entitled–Series 5000 Polyethylene Ceiling Inlets.

Primary Examiner—William E. Tapolcai
Attorney, Agent, or Firm—Palmatier, Sjoquist & Helget

[57] ABSTRACT

An air intake apparatus for an indoor wall of a barn. The air intake apparatus includes a frame structured to mount an insulated valve on either of its sides to accommodate orientation of the valve by a farmer. The frame further includes an integral trim to permit easy connection to the indoor wall and to minimize air flow between the frame and indoor wall.

8 Claims, 3 Drawing Sheets

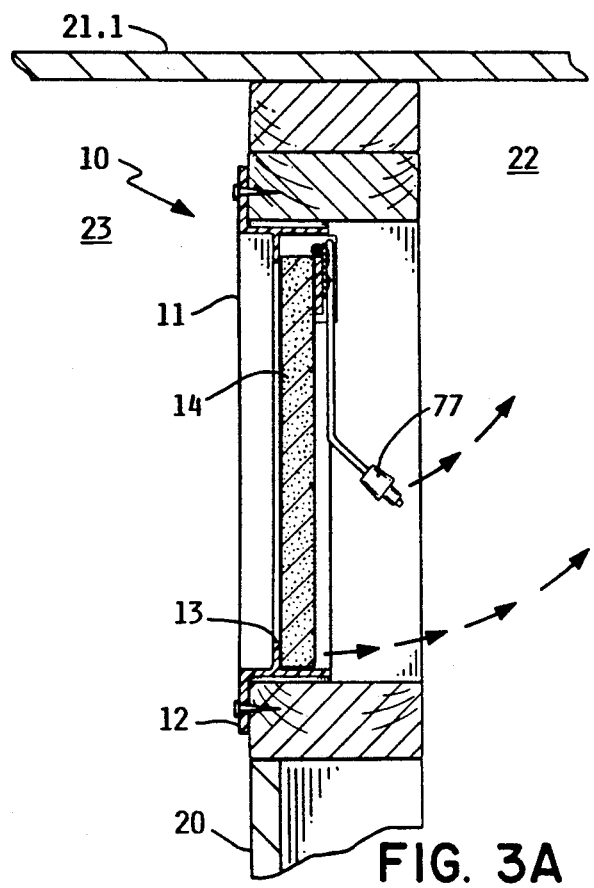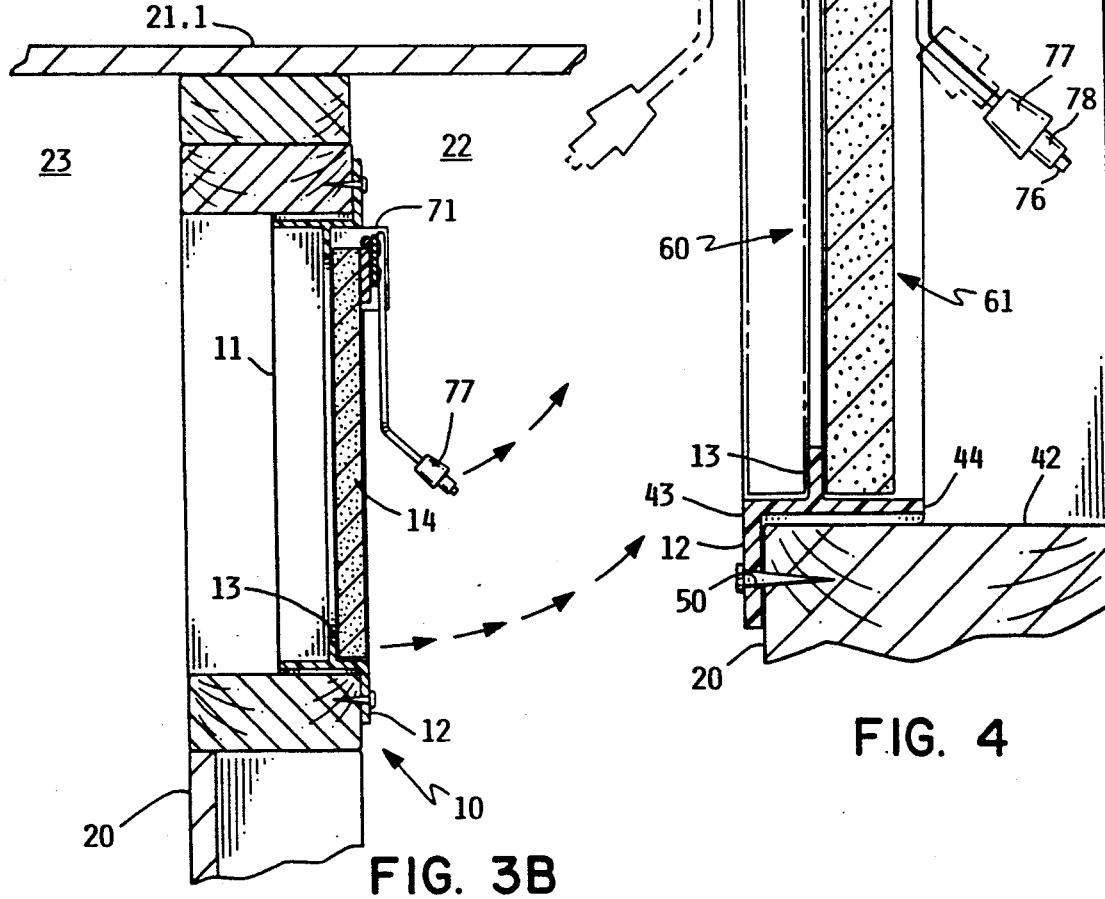
FIG. 3A
FIG. 3B
FIG. 4

AIR INTAKE APPARATUS FOR INNER WALL

The present invention relates to a counterweighted air intake apparatus for an inner wall of a structure and, more particularly, to such an apparatus with a medial valve seat for a reversible valve.

BACKGROUND OF THE INVENTION

A barn may have an elongate interior access hall which leads to a number of animal stalls. The means for access from the access hall to each of the animal stalls may include a door or other openings through which the animals are attended.

Besides permitting easy access to a great number of animal stalls, the access hall provides another function of warming air before it flows into the animal stalls. In a typical barn, air is slowly warmed in stages to take advantage of heat already present in the structure. Air is introduced first into the attic of the barn, then into the access hall, and finally into the various animal stalls.

SUMMARY OF THE INVENTION

A object of the present invention is to regulate the flow of air through an animal stall.

Another object of the present invention is to provide an air intake apparatus which is easy to install.

Still another object of the present invention is to provide an air intake apparatus which may be fixed on either side of the inner wall dividing the access hall and animal stall.

A feature of the present invention is the provision in an air intake apparatus fixed in the inner wall of a structure and having a counterweighted valve, of a flange peripherally extending from one face of the frame of the valve to trim the air intake apparatus relative to the inner wall to minimize air flow between the inner wall and the frame of the air intake apparatus.

Another feature is the provision in such an air intake apparatus, of a valve seat extending from an inner surface of a frame and being disposed approximately medially between the inlet and outlet of the frame such that the valve is reversible.

Another feature is the provision in such an air intake apparatus, of the counterweighted valve being swingable for at least 90° relative to the frame to maximize air flow through a given size of ports of the air intake apparatus.

An advantage of the present invention is that the air intake apparatus may be installed on either of the surfaces of the inner wall, i.e., the wall surface of the access hall or the wall surface of the animal stall. Some features contributing to this advantage are the reversible valve and medial valve seat. When the trim is fixed on the wall surface of the access hall, the reversible valve is disposed opposite of the trim. When the trim is affixed on the wall surface of the animal stall, the reversible valve is disposed adjacent to the trim.

Another advantage is that drafts flowing into the animal stalls are minimized. One feature contributing to this advantage is the trim or flange extending from the frame of the apparatus to seal cracks or openings between the frame of the air intake apparatus and the inner wall in which it is fixed.

Another advantage is ease of installation. One feature contributing to this advantage is the trim or flange which may be readily connected to studs forming the framework of the inner wall.

Another advantage is that the present invention is simple and easy to operate and maintain. The counterweight is easily adjustable and the valve itself is self-regulating in response to differential air pressure. Ice buildup is minimized by the incorporation of an insulated styrofoam valve panel.

BRIEF DESCRIPTION OF THE DRAWINGS

FIG. 3A is a section view at lines 3A—3A of FIG. I.

FIG. 3B is a section similar to the section view of 3A, but shows an opposite orientation for the valve of the air intake apparatus.

FIG. 4 is detail view of the air intake apparatus of FIG. 3A.

DETAILED DESCRIPTION OF THE PREFERRED EMBODIMENTS

Figure 2:
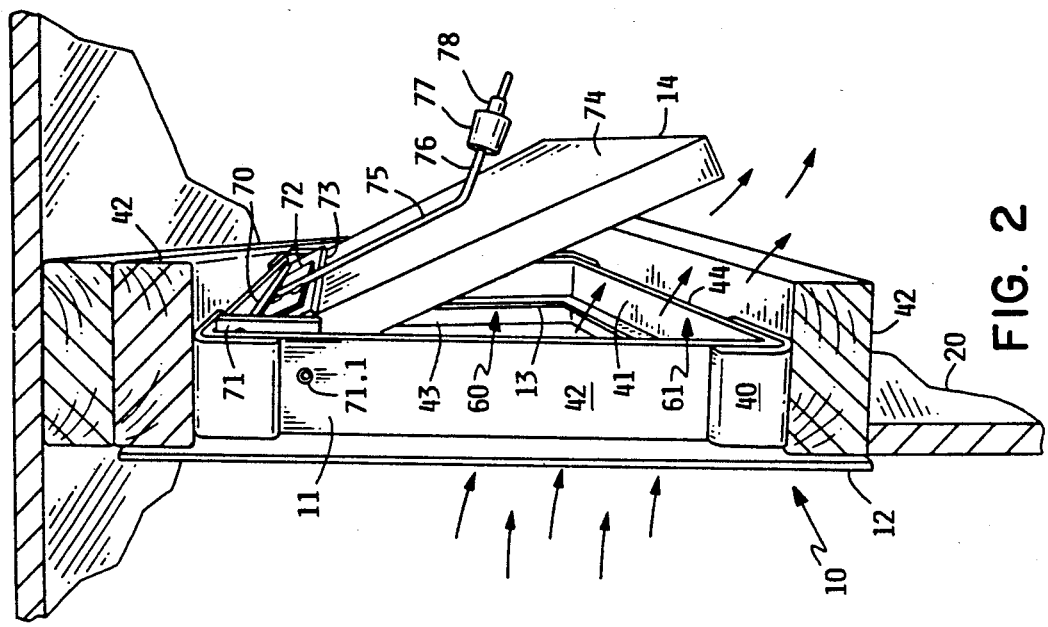
FIG. 2 is a detail perspective view of the air intake apparatus of FIG. 1.
Figure 1:
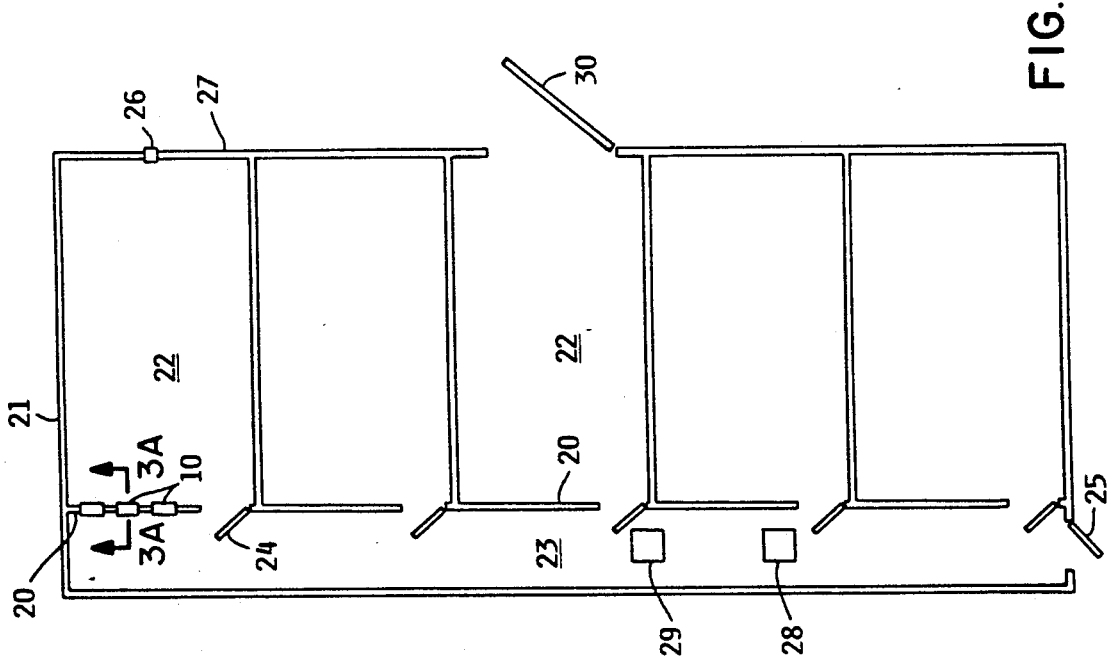
FIG. 1 is a diagrammatic view of the interior of a barn and shows a desirable location of the present air intake apparatus.

As shown in FIGS. 1 and 2, the present air intake apparatus is indicated in general by the reference numeral 10. It includes as its principal components a frame 11, a flange or trim 12, a medial valve seat 13, and a counterweighted valve 14 for responding to differential air pressure.

As shown in FIG. 1, the air intake apparatus 10 is typically fixed in an inner wall 20 of a barn 21 and adjacent to a ceiling 21.1 of the barn 21. The barn 21 includes a number of animal rooms or cubicles 22. The stalls 22 are attended to by farmers through an access hall 23. For access from the access hall 23 to the rooms 22, gates or doors 24 may be provided. An outer door 25 permits access to the outdoors from the access hall 23. An exhaust fan 26 may be provided in the outer wall 27 of each of the rooms 22 to exhaust foul air from the stalls and to thereby set in operation the counterweighted valves 14 which open in response to differential air pressure to permit the influx of fresh air to the rooms 22. Animal doors 30 may be provided for each of the rooms 22.

Fresh air is introduced into the barn 21 in stages and is thereby slowly warmed. First, air is drawn into the attic of the barn 21, such as by a cupola. As to a cupola, U.S. Pat. No. 4,850,265 is incorporated by reference. From the attic, where the fresh air is tempered, the air is introduced to the access hall 23 via a vent 28. In the access hall 23, the fresh air is further warmed such as by a heater 29. From the access hall 23, the warmed fresh air flows through the air intake apparatus 10 into the animal room 22. Such flow through the intake apparatus 10 is initiated by a differential between the air pressures of the rooms 22 and the access hall 23. The differential air pressure is typically caused by the operation of the exhaust fan 26 to draw foul air from the animal rooms 22.

The frame 11 of the air intake apparatus 10 is rectangular and is supported at its corners by four respective right-angled braces 40. The frame further includes an inner surface 41 and an outer surface 42. The braces 40 and outer surface 42 confront studs 42 which form a structural framework for the inner wall 20. The frame 11 further includes opposing rectangular edges 43, 44.

The frame 11 is fixed to the studs 42 of the inner wall 20 by the flange or trim 12 which includes apertures 50 for engaging pin connectors 51 such as nails or screws. The flange 12 is rectangular and extends outwardly and integrally from edge 43 of the frame 11. The flange 12 is disposed at a right angle to its respective portions of the outer surface 42 of the frame 11. As well as permitting easy connection to the studs 42, the flange or trim 12 prevents drafts through cracks or openings which may be formed between the frame 11 and the studs 42. Furthermore, a flange or trim 12 hides imperfect construction which may result from forming a hole in the inner wall 20 for locating the air intake apparatus 10.

The valve seat 13 is rectangular and extends inwardly at a right angle and integrally from the inner surface 41 of the frame 11 for seating the counterweight valve 14. The valve seat 13 extends medially between the opposing edges 43, 44 to define two ports 60, 61. Each of the ports 60, 61 may serve as both an inlet and outlet, depending upon the location of the counterweighted valve 14.

The counterweighted valve 14 includes a rod 70 which engages apertures formed in spacers 71. Spacers 71 are rigidly and removably affixed to the frame 11 via pin connectors 71.1. As well as spacing the sides of the valve 14 from the frame 11, the spacers 71 and their respective pin connectors 71.1 provide means for removing the valve from one of the ports 60, 61 and for securing the valve 14 to the other of the ports 60, 61.

The rod 70 is rigidly affixed, such as by welding, to a rigid metal piece 72. The metal piece 72 is fixed in turn to an elongate rigid plastic strip 73 extending approximately the width of the valve 14 to lend rigidity to an insulating styrofoam rectangular valve plate 74 which engages the valve seat 13. A shaft 75 is rigidly affixed, such as by welding, to the metal piece 72 and extends downwardly therefrom. The shaft 75 includes an oblique portion 76 on which a frustoconical counterweight 77 is slidably adjustable via a rubber or rubber-like stop or grommet 78 which then frictionally and slidably engages the oblique shaft portion 76 to adjust the position of the weight 77 relative to the rotatable rod 70. By sliding the weight 77 away from the rod 70, the amount of leverage exerted by the counterweight 77 upon the valve plate 74 is increased, thereby decreasing the size of its respective port 60, 61 and thus decreasing air flow into one of the rooms 22 for a given differential pressure.

In operation, when the flange or trim 12 is to be secured to the surface of the inner wall 20 which defines the access hall 23, the valve 14 is located opposite of the trim 12 and adjacent to frame edge 44, as shown in FIG. 3A. When the flange or trim 12 is to be secured to the surface of the inner wall 20 which defines the animal room 22, the valve 14 is located adjacent the trim 12 and opposite to the frame edge 44, as shown in FIG. 3B. The valve 14 is thus reversible by simply removing the pin connector 71.1 and locating the spacer 71 such that the valve plate 74 cooperates with the other of the ports 60, 61. When located in one of the ports 60, 61, the valve plate 74 engages one side of the medial valve seat 13; when located in the other of the ports 60, 61, the valve plate 74 engages the other side of the medial valve seat 13.

After being fixed in the inner wall 20, the grommet 78 is oriented to fix the counterweight 77 at a desired location for the proper amount of leverage to be exerted upon the valve plate 74. Subsequently, in response to differential air pressure in the room 22 relative to the access hall 23, the valve 14 meters fresh air into the room 22. The trim 12 minimizes the unregulated flow of air into the room 22 by blocking cracks or openings formed between the frame 11 and the inner wall 20.

Figure 5:
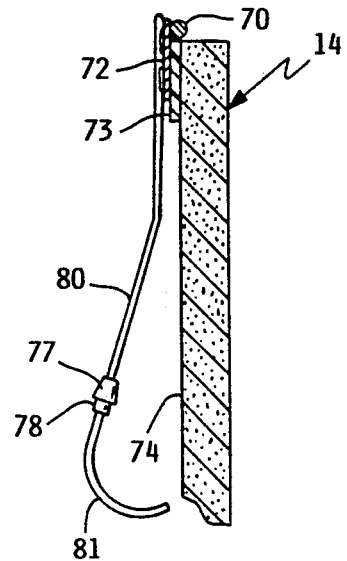
FIG. 5 is a partial view of the present air intake apparatus and shows an alternate counterweight.

In an alternate embodiment of the invention, as shown in FIG. 5, the valve 14 includes a shaft 80 looped back or curving around toward the valve plate 74. Such a curving prevents the inadvertent or accidental loss of the counterweight 77 by the counterweight sliding off of the shaft 80. The chance of such a loss is minimized by the distal curved end 81, which has a greater curvature than the shaft-receiving bore formed linearly in the counterweight 77.

It should be noted that shaft 80 has a parallel portion 82 running parallel to the valve plate 74. This parallel portion permits the valve plate 74 to swing as close as possible to the stud 42 or other portion of the inner wall 20 such that the valve plate 74 swings at least 90°. This parallel portion is also found in shaft 75.

Figure 6:
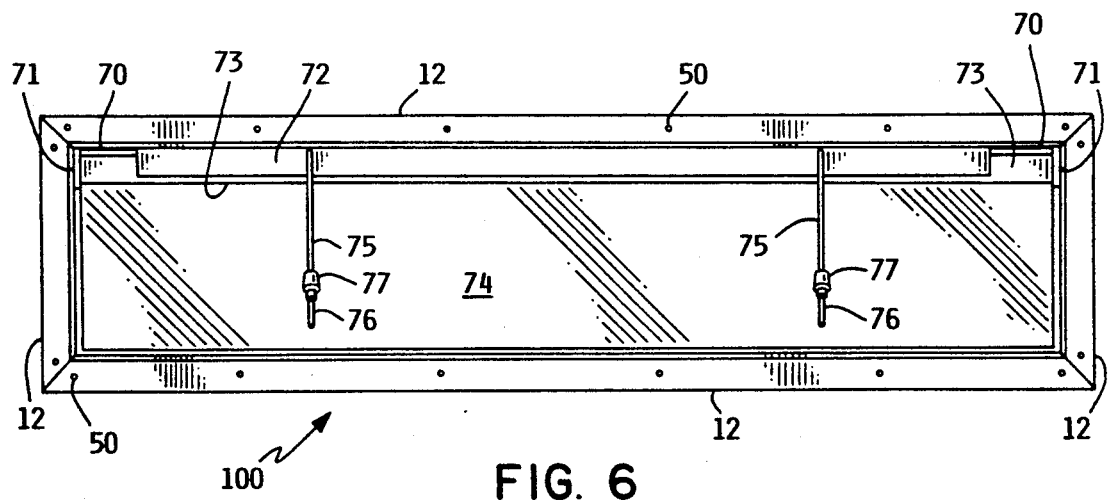
FIG. 6 is an alternate elongate embodiment of the present air intake apparatus.

In another alternate embodiment of the invention, as shown in FIG. 6, an air intake apparatus 100 may include two or more counterweights 77 and respective shafts 75. Except for the greater width or length of the apparatus 100 and the additional counterweight 77 and shaft 75, the air intake apparatus 100 is identical to its counterpart designated by the reference numeral 10. A single air intake apparatus 100 may replace two or three or more air intake apparatus 10 which ar disposed in line as shown in FIG. 1.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An air intake apparatus for being affixed in an inner wall, comprising
   a frame with outer and inner surfaces and opposing edges, the outer surface of the frame confronting the inner wall, the inner surface of the frame forming an inlet port and an outlet port, the frame lying in generally a vertical plane defined by the inner wall,
   a flange integrally extending from one of the edges of the frame and peripherally and outwardly relative to the outer surface of the frame to trim the frame relative to the inner wall,
   a counterweighted valve comprising an insulated styrofoam plate and swingably and removably mounted in the frame and responding to differential air pressure for permitting air flow through the ports, the valve being swingable for at least 90° relative to the frame, the insulated plate includes a rigid strip affixed to the styrofoam, the rigid strip being fixed to a rod rotatably mounted in the frame to provide for swinging of the valve,
   and a valve seat extending inwardly from the inner surface of the frame and being disposed approximately medially between the side of the frame to divide the ports whereby the valve is removably mountable in either of the ports of the frame.

2. The air intake apparatus according to claim 1, wherein the counterweighted valve includes an adjustable counterweight for adjusting an amount of leverage to be exerted by the valve on air flow through the inlet and outlet such that the valve is responsive to the differential air pressure.

3. The air intake apparatus according to claim 2, wherein the adjustable counterweight includes a weight and a rod affixed to the valve, the weight being slidable on the rod to and away from the valve to vary the amount of leverage.

4. The air intake apparatus according to claim 3, wherein the rod includes a distal oblique portion disposed obliquely of the valve.

5. The air intake apparatus according to claim 3, wherein the rod includes a distal portion with curvature.

6. The air intake apparatus according to claim 1, wherein the rigid strip comprises a metal piece to provide further rigidity to the rigid strip.

7. The air intake apparatus according to claim 1, wherein the flange comprises pin-engaging apertures for connection to the inner wall.

8. An air intake apparatus for being fixed in the inner wall of a structure, comprising a rectangular frame with outer and inner surfaces and opposing sides, the outer surface of the frame confronting the inner wall, the inner surface of the frame forming an inlet port and an outlet port, a rectangular flange integrally affixed to one side of the frame and extending peripherally and outwardly at a right angle relative to the outer surface of the frame to trim the frame relative to the inner wall, the flange comprising pin-engaging apertures for connection to the inner wall, a rectangular counterweighted valve swingably and removably mounted in the frame and responding to differential air pressure for permitting air flow through the ports, the valve being swingable for at least 90° relative to the frame, the valve comprising an insulated plate of styrofoam with a rigid strip having a metal piece, the valve further comprising a horizontally-extending rod rotatably mounted in the frame to provide for swinging of the valve, the metal piece being fixed to the rod, an adjustable counterweight affixed to the valve for adjusting an amount of leverage to be exerted by the valve on air flow through the inlet and outlet ports such that the valve is responsive to the differential air pressure, the counterweight comprising a bent rod affixed to the metal piece and extending downwardly therefrom and a weight slidable on the rod to and away from the metal piece to vary the amount of leverage, and a rectangular valve seat extending inwardly at a right angle from the inner surface of the frame and being disposed approximately medially between the sides of the frame whereby the valve is removable to be mounted on either of the sides of the frame.

* * * * *